Oct. 18, 1949.    T. J. MESH    2,485,211
TIME DELAY CENTRIFUGAL CLUTCH
Filed Nov. 14, 1947    2 Sheets-Sheet 1
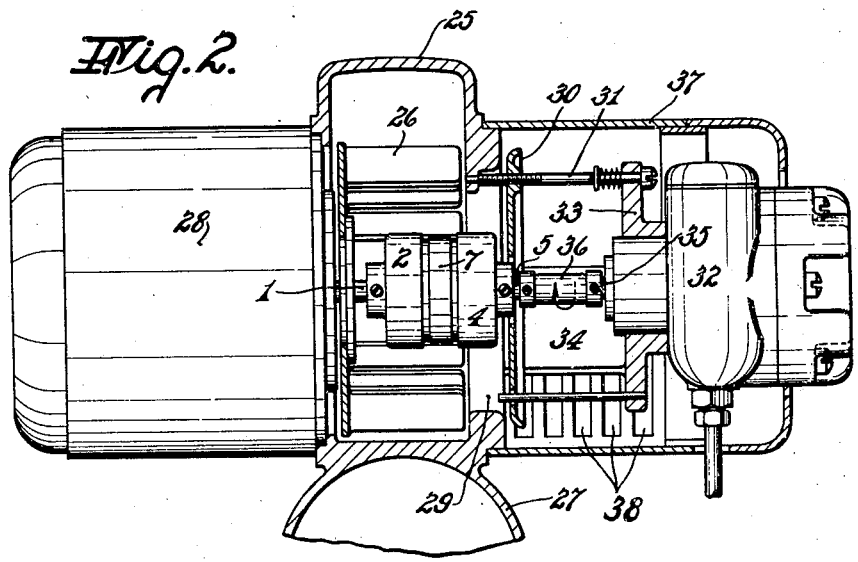
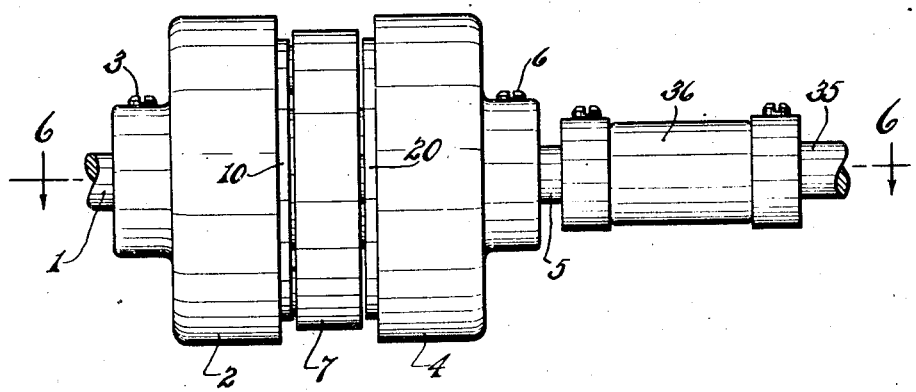
INVENTOR
THEODORE J. MESH
BY Chapin & Neal
ATTORNEYS Oct. 18, 1949.   T. J. MESH   2,485,211
TIME DELAY CENTRIFUGAL CLUTCH
Filed Nov. 14, 1947
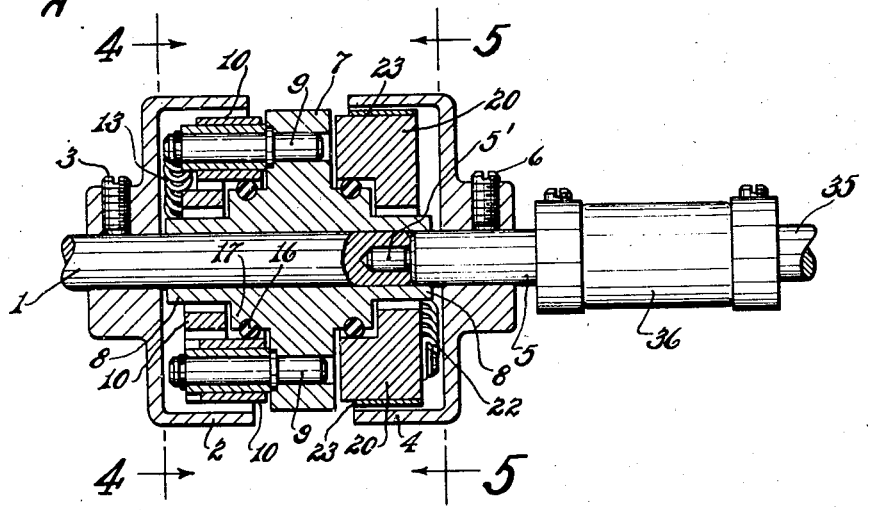
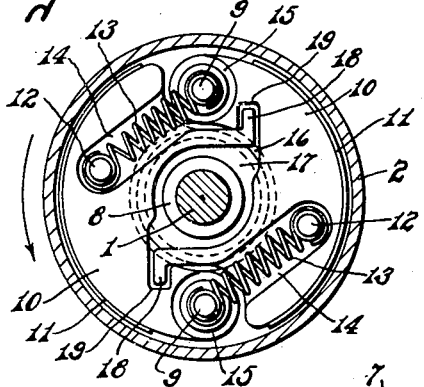
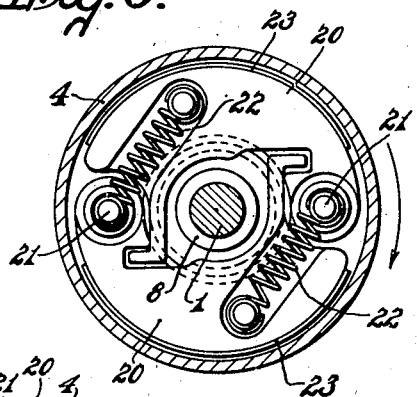
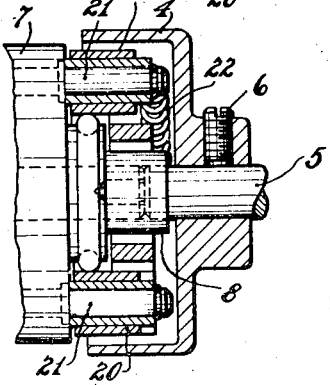
INVENTOR
THEODORE J. MESH
BY Chapin & Neal
ATTORNEYS Patented Oct. 18, 1949

2,485,211

UNITED STATES PATENT OFFICE 2,485,211

TIME DELAY CENTRIFUGAL CLUTCH

Theodore J. Mesh, Easthampton, Mass., assignor to Gilbert & Barker Manufacturing Company, West Springfield, Mass., a corporation of Massachusetts Application November 14, 1947, Serial No. 786,125

4 Claims. (Cl. 192—105)

This invention relates to an improved centrifugal clutch.

In the ordinary centrifugal clutch, as used in a motor driven transmission line, the clutch elements are engaged to drive the load as soon as the driving motor attains a certain percentage of its full speed. For example, the clutch elements may engage, when the motor reaches three quarters of its full speed. And with the ordinary construction, the clutch elements must engage before the motor attains full speed. There is a time interval between the starting of the motor and the picking up of the load but this interval is relatively short.

This invention has for an object the provision in a centrifugal clutch of an improved construction and arrangement of parts, which will enable the driving motor to reach full speed before the load is applied to the clutch and the load may be applied after the motor reaches full speed.

The invention also has for an object the provision in a centrifugal clutch of an improved construction and arrangement of parts which enables by a loosely coupled flywheel action a much greater delay between the time of starting of the driving motor and the time of application of the load than can be had with the ordinary centrifugal clutch.

The new clutch is particularly useful in oil burners of the character shown in the Logan Patent No. 1,985,934, dated January 1, 1935. In oil burners embodying the Logan invention, a centrifugal clutch is used to time the air and oil supply to the combustion zone and relate one supply to the other for the purpose of avoiding a smoky fire during the starting and stopping intervals and enabling the use of a more efficient air-oil burning ratio during the running interval of the burner. As applied to such a burner, the clutch of this invention improves the operation of the burner during its starting interval of operation. The air fan is enabled to operate at higher speed (full speed) and for a longer time before the oil pump is started, thus insuring a flow of air at the combustion zone at the proper rate and velocity before any oil is supplied at said zone. At the same time, on stopping the motor, the oil pump is disconnected as quickly as it is by the structure of said patent.

While the new clutch will be useful wherever its character of timing operation is wanted, its use in oil burners is so important that it will be explained in that connection to fully disclose by example how to practice the invention.

An example of the invention is shown in the drawings and its various features will be explained along with the detailed description of the example.

In the accompanying drawings:

Fig. 1 is an exterior elevational view of a centrifugal clutch embodying the invention;

Fig. 2 is a cross sectional view of an oil burner, showing the application thereto of the clutch of this invention;

Fig. 3 is a sectional elevational view of the clutch;

Figs. 4 and 5 are cross sectional views taken on the lines 4—4 and 5—5, respectively, of Fig. 3; and Fig. 6 is a fragmentary sectional view taken on the line 6—6 of Fig. 1.

Referring to these drawings; the clutch unit, as shown in Fig. 1, includes a driving shaft 1; a first and driving clutch drum 2, suitably fixed, as by a set screw 3, to shaft 1; a second and driven clutch drum 4, located coaxially of shaft 1; a driven shaft 5 to which drum 4 is suitably fixed, as by a set screw 6; and a carrier 7 for speed-responsive weight members to cooperate with the drums 2 and 4, as will later be explained in detail.

Referring next to Fig. 3, it will be seen that the carrier 7 is disk-like in form and has hubs 8 extending in opposite directions therefrom. The carrier 7 is initially to be driven from the driving shaft 1 only by frictional engagement. For this reason, the carrier is mounted on the driving shaft with a loose fit something like a running fit, which will give the desired amount of frictional engagement. The hubs 8 of the carrier 7 terminate one adjacent the end wall of each drum and limit the axial end play of the carrier 7 on its shaft. The driven drum 4 is held in coaxial relation with the drive shaft 1 by means of a pilot 5' on the driven shaft, which pilot is telescoped into a bearing hole in the adjacent end of shaft 1.

The carrier 7 carries on one face thereof, speed-responsive clutch elements to engage the periphery of drum 2 after the carrier has attained a predetermined speed. These elements may be of any suitable form. As shown in Fig. 4, the carrier 7 has fixed to it at diametrically opposite points two fulcrum pins 9 which project from one side face of the carrier into the interior of the clutch drum 2. A weight 10 is pivotally supported at one end on each pin 9. These weights are adapted to swing outwardly under the influence of centrifugal force. Each weight has a curved outer surface provided with a clutch facing 11 which, when the weight is thrown outwardly, presses against the inner periphery of drum 2 for a driving engagement. Each weight 10 has fixed thereto a stud 12 and each stud is connected by a spring 13 to the fulcrum pin 9 of the other weight. The weights are appropriately recessed at 14 and 15 to receive these springs. Each weight also has a curved inner surface coaxial with its outer curved surface and these curved inner surfaces are adapted to be drawn inwardly by springs 13 against a rubber bumper 16, in the shape of a torus ring, engaged in a groove in an annular portion 17 of the carrier. The facings 11 of the weights are then held out of driving engagement with drum 2. Each weight 10 has a hook 18, somewhat narrower than the rest of the weight (see Fig. 4), which hook is engaged in a notch 19 of the other weight as an emergency means to limit the extent to which the weights can be thrown outwardly by centrifugal force. These hooks and notches ordinarily have no limiting effect and do not interfere with the driving engagement between the weight facings 11 and drum 2. The weights 10 engage the drum 2 only after the carrier 7 has attained a predetermined speed.

The carrier 7 also carries other speed-responsive clutch elements for engaging the clutch drum 4, when the carrier attains a predetermined speed higher than the first-named speed at which the weights 10 make their driving engagement with drum 2. These elements may be similar to those just described. In Fig. 5 weights 20, pivoted one on each of two diametrically opposite fulcrum pins 21, fixed to carrier 7, are drawn inwardly by springs 22 and are adapted to be thrown outwardly by centrifugal force, after the carrier attains the requisite speed, until the clutch facings 23 on the weights engage the internal periphery of drum 4. The parts of the second speed-responsive clutch elements may be constructed, mounted and arranged in the same way as the first speed-responsive clutch elements, as indicated in Fig. 5.

In operation, when the driving shaft 1 starts to rotate, the carrier 7, with the weights 10 and 20 mounted thereon, is driven only by the frictional engagement between it and such shaft. The mass of the carrier and its weights is substantial and may be likened unto a flywheel. The inertia of the carrier and its weights will prevent the flywheel-like assembly from coming up to speed quickly. At first, the shaft 1 will turn in the hole in the carrier, since the two are not held together in any way except frictionally, and the shaft will very soon attain full speed, say in half a second. However, since there is friction between the shaft 1 and carrier 7, the rotation of the shaft will impart a small accelerating force to the flywheel-like carrier and weight assembly, whereby the latter will gradually increase in speed and, after a certain time reach the speed, at which the weights 10 will move outwardly by centrifugal force and engage the drum 2. The carrier 7 and drum 2 are then coupled together so that the drum drives the carrier. The carrier 7 will very quickly be brought up to the full speed of shaft 1 and then there will be no more relative movement between shaft 1 and the carrier. As the carrier reaches the second-named predetermined speed, the weights 20 will engage drum 4 and drive the latter and whatever load may be applied to driven shaft 5. The clutch weights 10 and 20 act in very quick succession in the order named to engage their respective drums. There is no appreciable time delay between the action of these two clutch members. However, they must act successively in order that the carrier 7 can be coupled firmly to drum 2, and thus driven independently of the frictional engagement between the carrier 7 and shaft 1, before the load is picked up by the engagement of the clutch weights 20 with drum 4. Obviously, if the load were applied to the carrier by the engagement of weights 20 with drum 4 prior to the engagement of the weights 10 with drum 2, the carrier would slow down and stop because the friction drive between shaft 1 and the carrier would not be sufficient to drive the load.

A definite and substantial delay between the time, when the driving shaft 1 starts, and the time, when driven shaft 5 starts, may be secured in the manner described. This time delay is much more than can be obtained in the operation of the ordinary centrifugal clutch, where a single set of speed-responsive elements, fixed to a driving shaft, engage a clutch drum on the driven shaft. For example, in such a case the driving shaft might come up to full speed in half a second and the clutch would act at about three-quarters speed to pick up the load on the driven shaft. With my invention, the action of the centrifugal clutch elements can be postponed for a much longer interval, for example, 5 seconds. Also, the driving shaft can attain full speed and operate at full speed for a substantial time before the load is picked up. The length of this time interval may, of course, be varied. Increase or decrease of the mass of the carrier and its weights will, respectively, increase or decrease the time interval, other factors being equal. Likewise, increase or decrease of the tension of the springs 13 will respectively increase or decrease the time interval, other factors being equal. So, also, increase or decrease in the coefficient of friction between the driving shaft and carrier will respectively decrease or increase the time interval, other factors being equal. The amount of friction between the shaft 1 and the carrier 7 can be varied by varying the fit between these parts and also by choice of the materials of which these parts are made. When values for these various factors are chosen and provided for in the structure the time necessary to bring the carrier and weight assembly up to speed can be calculated.

The time delay applies only to the starting period. On stopping, the load will be disconnected as soon as the speed of the carrier drops to the predetermined speed, at which the weights 20 move inwardly and disengage from drum 4. Such delay as occurs in the disconnection of the load is no more than that which customarily occurs in the operation of the usual centrifugal clutch and is relatively short.

It should be noted that the relative rotation between the carrier 7 and the driving shaft 1 occurs only during the stopping and starting intervals of operation of the clutch and that these intervals are relatively short as compared to the intervals of normal operation where the clutch elements are engaged. Also, the carrier 7 is not under load while moving relatively to shaft 1. In view of these facts, the wear between the shaft and carrier should be relatively slow and, of course, these parts may be made of good wear-resisting material to lessen the rate of wear. Any wear, which does occur, tends to increase the time interval between the starting of the driving shaft and the picking up of the load and generally does no harm.

One very desirable use for the invention is in connection with oil burners and the clutch of this invention may be interposed in the drive between the air supply fan and the oil supply pump of the burner. This application of the invention is shown in Fig. 2, wherein 25 is the fan casing and 26 the fan for supplying air for combustion to the air tube 27 of the burner. The fan 26 is driven by an electric motor 28 and draws in air through an inlet 29, controlled by a shutter 30, adjustable by turning a screw 31. The oil supply pump is shown at 32. It is supported from a frame including the parts 33 and 34, secured to one side of fan casing 25. The shaft 35 of the pump is connected by a flexible coupling 36 to the driven shaft 5 of the clutch. The driving shaft 1 of the coupling is, in this case, the shaft of motor 28 and the fan 26 is fixed to this shaft. In some cases, the clutch may be located nearer the pump than the fan and then the clutch driving shaft 1 might be connected by the flexible coupling to the shaft of motor 28 and the shaft 35 of the oil pump connected to the driven clutch drum 4, in place of shaft 5, and held in place by the screw 6. A casing 37 encompasses the shutter and most of pump 32 and has openings 38 to enable air to enter the casing and flow to the inlet 29 of the fan.

As applied to an oil burner, my improved clutch enables the driving motor 28 and fan 26 to attain full speed before the oil pump is driven. According to said Logan patent, the clutch elements would engage and drive the oil pump before the motor and fan attained full speed, and usually it is not feasible for the clutch elements to engage at a speed much higher than three-quarters of the full speed of the driving motor. Moreover, my clutch by its loosely coupled flywheel action provides for a substantial delay between the time of starting of the motor and the time of starting of the pump, which delay is many times greater than is possible with the clutch of said patent. Accordingly, the fan 26 can be operated at full speed for a substantial time interval, long enough to completely scavenge the burner tube 27 and get air moving through the combustion chamber and the gas passages of the heating unit and the stack before oil is fed to the air. The arrangement insures that air will be moving at the proper rate and velocity at the combustion zone before any oil is supplied at such zone, thus avoiding any difficulties from a smoky fire and enabling the burner to operate with an air-oil ratio that will yield efficient combustion.

On stopping of the burner, the oil pump is disconnected as quickly as it is with the clutch of said Logan patent. The weights 20 disengage from drum 4 as soon as the motor speed slackens sufficiently, say for example, to three-quarters speed. After the heavy load of the pump is cut off by the disengagement of the clutch elements 4 and 20, the motor and fan are enabled to coast for a time because of their momentum, due more especially to the heavy mass of the rotor of the motor 28. For a time, the mass of the clutch carrier 7, and its weights 10 and 20, aid by their momentum in the rotation of the fan until the speed decreases to the point at which the clutch elements 10 and 2 disengage. If sufficient scavenging is not obtained by the coasting action of the fan it will be obtained when the motor is next started by the action of the fan at full speed for a substantial time before the flow of oil.

The invention thus provides an improved centrifugal clutch which, through a loosely-coupled flywheel action, enables the driving shaft and motor to attain full speed and to be operated at full speed over a substantial time interval before the application of the load.

I claim:

1. A time delay clutch, comprising, a driving shaft, a driving clutch element fixed to said shaft, a driven clutch element mounted coaxially of the first element and shaft, a carrier mounted on and having a frictional driving engagement with said shaft and interposed between the driving and driven elements; a first spring-retracted speed-responsive clutch element mounted on said carrier and operable by centrifugal force after the carrier, while driven by frictional engagement from the driving shaft, has attained a predetermined speed, to engage the driving clutch element, whereby the carrier becomes coupled to and driven by the driving clutch element instead of by said frictional engagement; a second spring-retracted speed-responsive clutch element mounted on said carrier and operable by centrifugal force, after the carrier becomes coupled to said driving clutch element, to engage and drive the driven clutch element; said carrier with its speed-responsive clutch elements having considerable mass and acting like a flywheel loosely-coupled to the driving shaft, being initially driven from the driving shaft only by friction and because of its inertia requiring a substantial time interval to acquire the necessary speed to engage the first speed-responsive clutch element with said driving clutch element, after which the second speed-responsive clutch element engages the driven clutch element and drives the same.

2. A time delay clutch, comprising a driving shaft, a first and driving clutch drum fixed to said shaft, a second and driven clutch drum mounted coaxially of the first drum and shaft, a carrier mounted on and having a frictional driving engagement with said driving shaft, weights mounted on said carrier for movement outwardly by centrifugal force to engage the first clutch drum, springs for holding the weights out of engagement with the first clutch drum until the carrier, while driven by frictional engagement with the driving shaft, has attained a predetermined speed, whereby the carrier becomes coupled to and driven by said driving clutch element instead of by frictional engagement with the driving shaft, a second set of weights mounted on the carrier for movement outwardly by centrifugal force to engage the second clutch drum, and springs for holding the second weights out of engagement with the second drum until the carrier rotates faster than said speed, said carrier being initially driven from said shaft solely by friction and because of its inertia requiring a substantial time interval to reach said speed, the carrier then being driven by the first clutch drum after which the second weights engage the driven drum and drive the latter.

3. A centrifugal clutch, comprising a driving shaft, a driving clutch element fixed thereto, a driven clutch element mounted coaxially of the driving shaft, and coupling mechanism between said driving and driven clutch elements; said mechanism comprising a carrier of substantial mass mounted on and having a frictional driving engagement with the driving shaft, said carrier carrying a first spring-retracted weight adapted, after the carrier while driven by frictional engagement with the driving shaft attains a predetermined speed, to engage said driving clutch element and be driven thereby, and a second spring-retracted weight adapted, when the carrier rotates faster than said speed, to engage and drive said driven clutch element; said carrier and said weights operating as a flywheel loosely coupled to said driving shaft, whereby on starting, the driving shaft turns in the carrier and rapidly attains full speed while the carrier, because of its inertia and because it is initially driven from the driving shaft only by friction, builds up speed relatively slowly, thus providing for a substantial time interval before the carrier attains the speed necessary to engagement of the first weight with the driving clutch element.

4. A centrifugal clutch structure for the purpose described, comprising, a driving clutch drum, a driven clutch drum, a frictionally-driven carrier interposed between the drums, spring-retracted clutch-engaging means mounted on said carrier and movable by centrifugal force when the carrier attains a predetermined speed to engage said driving drum and couple the carrier to such drum for a driving engagement, and a second spring-retracted clutch-engaging means mounted on the carrier and movable by centrifugal force when the carrier attains a higher predetermined speed to engage the driven clutch drum and couple the latter to the carrier.

THEODORE J. MESH.

REFERENCES CITED

The following references are of record in the file of this patent:

UNITED STATES PATENTS

| Number | Name | Date |
|---|---|---|
| 1,744,367 | Jacobs et al. | Jan. 21, 1930 |

FOREIGN PATENTS

| Number | Country | Date |
|---|---|---|
| 283,380 | Great Britain | Jan. 12, 1928 |